(12) United States Patent
Zappulla et al.

(10) Patent No.: US 11,360,039 B2
(45) Date of Patent: Jun. 14, 2022

(54) IDENTIFICATION OF VARIATIONS OR DEFECTS IN A SLAB MATERIAL, MADE FROM A CONTINUOUS CASTING PROCESS

(71) Applicant: Colorado School of Mines, Golden, CO (US)

(72) Inventors: Matthew L. S. Zappulla, Golden, CO (US); Brian G. Thomas, Arvada, CO (US)

(73) Assignee: Colorado School of Mines, Golden, CO (US)

( * ) Notice: Subject to any disclaimer, the term of this patent is extended or adjusted under 35 U.S.C. 154(b) by 269 days.

(21) Appl. No.: 16/774,860

(22) Filed: Jan. 28, 2020

(65) Prior Publication Data

US 2020/0240938 A1    Jul. 30, 2020

Related U.S. Application Data

(60) Provisional application No. 62/797,582, filed on Jan. 28, 2019.

(51) Int. Cl.
*G01N 25/72* (2006.01)
*B22D 2/00* (2006.01)
*B22D 11/16* (2006.01)

(52) U.S. Cl.
CPC .............. *G01N 25/72* (2013.01); *B22D 2/00* (2013.01); *B22D 2/006* (2013.01); *B22D 11/16* (2013.01)

(58) Field of Classification Search
USPC ......................................................... 702/36
See application file for complete search history.

(56) References Cited

U.S. PATENT DOCUMENTS

| | | | | |
|---|---|---|---|---|
| 4,774,998 A | * | 10/1988 | Matsushita | B22D 11/16 164/154.5 |
| 2002/0079083 A1 | * | 6/2002 | Suzuki | B22D 11/182 164/453 |
| 2009/0138223 A1 | * | 5/2009 | Kim | G05B 19/41875 702/81 |

OTHER PUBLICATIONS

"Abaqus 6.13 User's Guide," DS Simulia Corp, 2013, 1138 pages.
"ANSYS Fluent User's Guide," ANSYS, Inc., Nov. 2013, 2692 pages.
"MATLAB—MathWorks—MATLAB & Simulink," MathWorks, date unknown, retrieved from https://www.mathworks.com/products/matlab.html, 4 pages.
"Tecplot 360 Ex User's Manual," Tecplot, Inc., 2019, retrieved from http://download.tecplot.com/360/current/360_users_manual.pdf, 561 pages.

(Continued)

*Primary Examiner* — Paul D Lee
(74) *Attorney, Agent, or Firm* — Sheridan Ross P.C.

(57) ABSTRACT

Systems, methods, and apparatuses are provided herein that track an integrated deviation of a physical property of a material that corresponds to a variation or defect in the material. In one embodiment, molten steel begins to solidify and move past an instrumented region of a mold. Sensors in the mold can detect a deviation in temperature of the instrumented region of the mold that signifies a variation or defect in the surface of the slab material as it solidifies. The systems, methods, and apparatuses track the integrated temperature deviation to more clearly visualize defects that may otherwise not be detectable by simply observing the temperatures of the mold and slab material in real time.

20 Claims, 9 Drawing Sheets

(56) References Cited

OTHER PUBLICATIONS

Badri et al., "Heat Flux Calculations From Thermocouples—What Can Be Measured?," Steelmaking Conference Proceedings, No. PR-049-065, 2002, pp. 65-76. Abstract only.
Bergman et al., "A Rule-based Tool for Assisting Colormap Selection," Proceedings of the 6th IEEE Visualization Conference, 1995, pp. 118-125.
Borland et al., "Rainbow Color Map (Still) Considered Harmful," IEEE Computer Graphics and Applications, vol. 27, No. 2, Mar. 5, 2007, pp. 14-17.
Cho et al., "Effect of Nozzle Port Angle on Transient Flow and Surface Slag Behavior During Continuous Steel-Slab Casting," Metallurgical and Materials Transactions B, vol. 50, No. 1, 2019, pp. 52-76. Abstract only.
Gresho et al., "Don't Suppress the Wiggles—They're Telling You Something!," Computers & Fluids, vol. 9, No. 2, preprint dated Jul. 1979, pp. 223-253.
Hashash et al., "Glyph and hyperstreamline representation of stress and strain tensors and material constitutive response," International Journal for Numerical and Analytical Methods in Geomechanics, vol. 27, 2003, pp. 603-626.
Hedin et al., "Exploring Opportunities in Mold Temperature Monitoring Utilizing Fiber Bragg Gratings" SCANMET V: 5th International Conference on Process Development in Iron and Steelmaking Proceedings, 2018, 10 pages.
Hunter, "Matplotlib: A 2D Graphics Environment," Computing in Science & Engineering, vol. 9, No. 3, 2007, pp. 90-95.
Jin et al., "Large Eddy Simulations of Electromagnetic Braking Effects on Argon Bubble Transport and Capture in a Steel Continuous Casting Mold," Metallurgical and Materials Transactions B, vol. 49, No. 3, Jun. 2018, pp. 1360-1377.
Kawamoto et al., Improvement of the Initial Stage of Solidification by Using Mild Cooling Mold Power, ISIJ International, vol. 37, No. 2, 1997, pp. 134-139.
Kumar et al., "Development of intelligent mould for online detection of defects in steel billets," Ironmaking & Steelmaking, vol. 26, No. 4, 1999, pp. 269-284.
Moreland, "Diverging Color Maps for Scientific Visualization," Proceedings of the 5th International Symposium on Advances in Visual Computing: Part II, Nov. 2009, pp. 92-103.
Moreland, "Why We Use Bad Color Maps and What You Can Do About It," Society for Imaging Science and Technology International Symposium on Electronic Imaging, 2016, 6 pages.
Salazar-Campoy et al., "A Physical Model to Study the Effects of Nozzle Design on Dense Two-Phase Flows in a Slab Mold Casting Ultra-Low Carbon Steels," Metallurgical and Materials Transactions B, vol. 38, No. 2. Apr. 2017, pp. 1376-1389.
Sengupta et al., "Micrograph evidence of meniscus solidification and sub-surface microstructure evolution in continuous-cast ultralow-carbon steels," Acta Materialia, vol. 54, 2006, pp. 1165-1173.
Spierings et al., "Development and Application of Fiber Bragg Gratings for Slab Casting," AISTech 2017 Proceedings, 2017, 8 pages.
Stewart et al., "The prediction of longitudinal cracking during slab casting," Steelmaking Conference Proceedings, 1996, p. 207.
Thomas et al., "Casting Process Simulation and Visualization: A JOM-e Perspective," JOM, vol. 54, No. 1, Jan. 2002, pp. 20-21.
Thomas et al., "Implementation of Temperature and Strain Micro-Sensors into a Casting Mold Surface," in "Sensors, Sampling, and Simulation for Process Control," Minerals, Metals, and Materials Society, Feb. 2011, 8 pages.
Thomas et al., "Mathematical model of the thermal processing of steel ingots: Part II. Stress model," Metallurgical and Materials Transactions B, vol. 18, No. 131, 1987, Abstract only.
Thomas et al., "The Visualization of Defect Formation during Casting Processes," JOM, electronic edition, Dec. 2006, pp. 16-18.
Thomas et al., "Transient Fluid-Flow Phenomena in the Continuous Steel-Slab Casting Mold and Defect Formation," JOM, electronic edition, Dec. 2006, 20 pages.
Timmel et al., "Experimental Investigation of the Flow in a Continuous-Casting Mold under the Influence of a Transverse, Direct Current Magnetic Field," Metallurgical and Materials Transactions B., vol. 42, No. 1, Feb. 2011, pp. 68-80.
Tirian et al., "Adaptive control system for continuous steel casting based on neural networks and fuzzy logic," Neurocomputing, vol. 125, Feb. 2014, pp. 236-245. Abstract only.
Zappulla et al., "Effect of Grade on Thermal-Mechanical Behavior of Steel During Initial Solidification," Effect of Grade on Thermal-Mechanical Behavior of Steel During Initial Solidification A, vol. 48, No. 8, Aug. 2017, pp. 3777-3793. Abstract only.
Zappulla et al., "Surface Defect Formation in Steel Continuous Casting," Materials Science Forum, vol. 941, Dec. 2018, pp. 112-117.
Zappulla et al., "Thermal-Mechanical Model of Depression Formation in Steel Continuous Casting," TMS 2017: 146th Annual Meeting & Exhibition Supplemental Proceedings, 2017, pp. 501-510. Abstract only.
Zappulla et al., "Visualization of Steel Continuous Casting Including a New Integral Method for Post-Processing Temperature Data," Steel Research International, vol. 90, No. 3, Jan. 2019, 11 pages.
Zappulla, "Grade Effects on Thermal-Mechanical Behavior During the Initial Solidification of Steel," Thesis Submitted in partial fulfillment of the requirements for the degree of Master of Science in Mechanical Engineering in the Graduate College of the University of Illinois at Urbana-Champaign, 2016, retrieved from https://www.ideals.illinois.edu/bitstream/handle/2142/92678/ZAPPULLA-THESIS-2016.pdf, 144 pages.
Zhang et al., "Integrated Monitoring Solution to Start-Up and Run-Time Operations for Continuous Casting," IFAC Proceedings Volumes, vol. 36, No. 5, Jun. 2003, pp. 561-566.
Zhou et al., "A Survey of Colormaps in Visualization," IEEE Transactions on Visualization and Computer Graphics, vol. 22, No. 8, Aug. 2016, pp. 2051-2069.

* cited by examiner

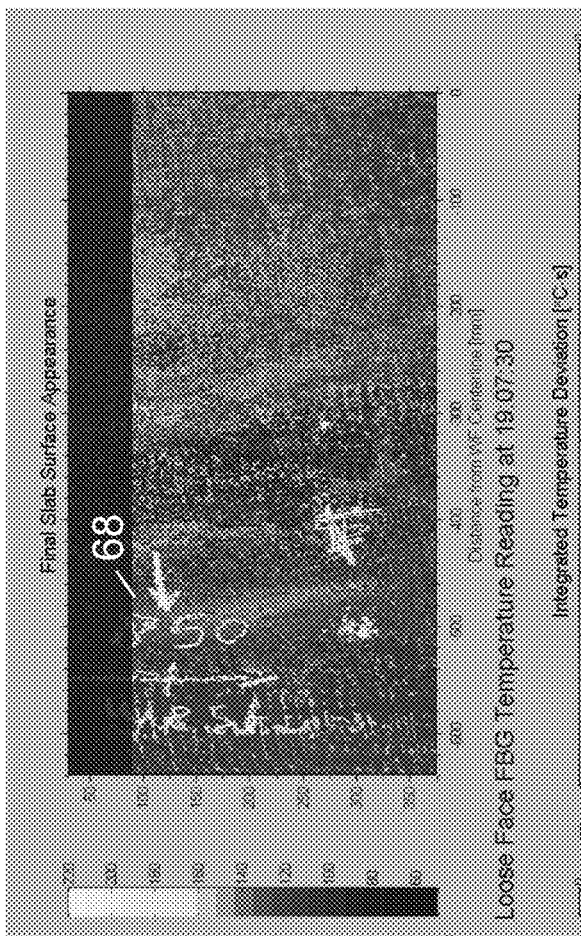
FIG. 6B
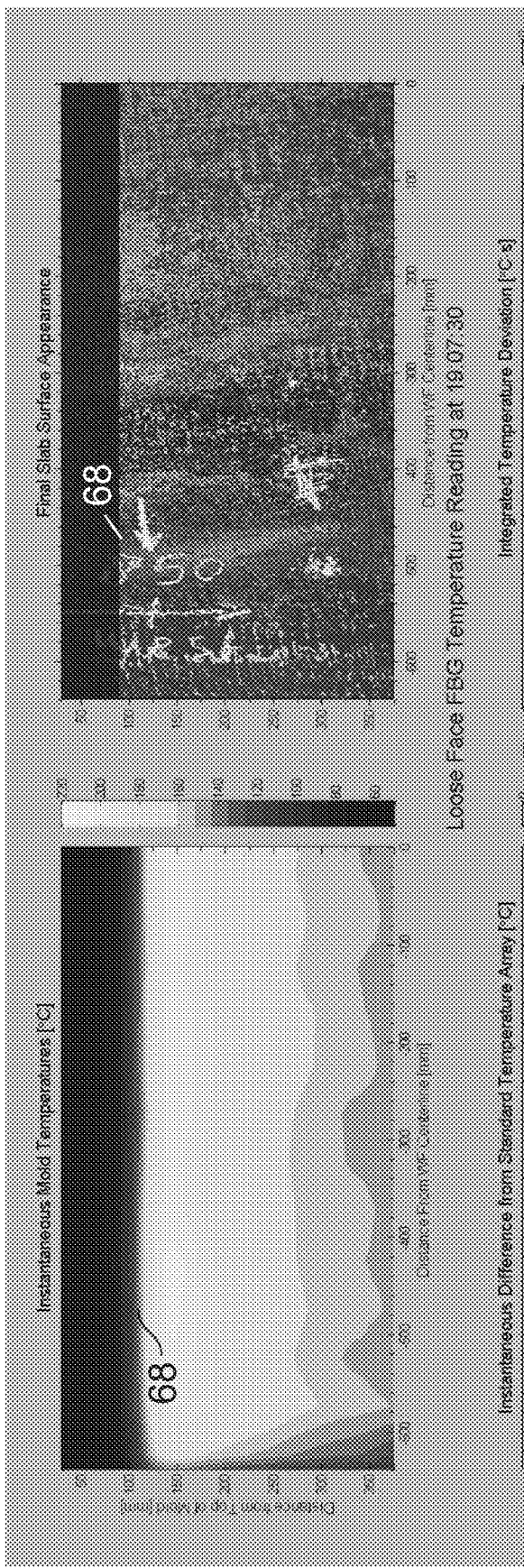
FIG. 6A
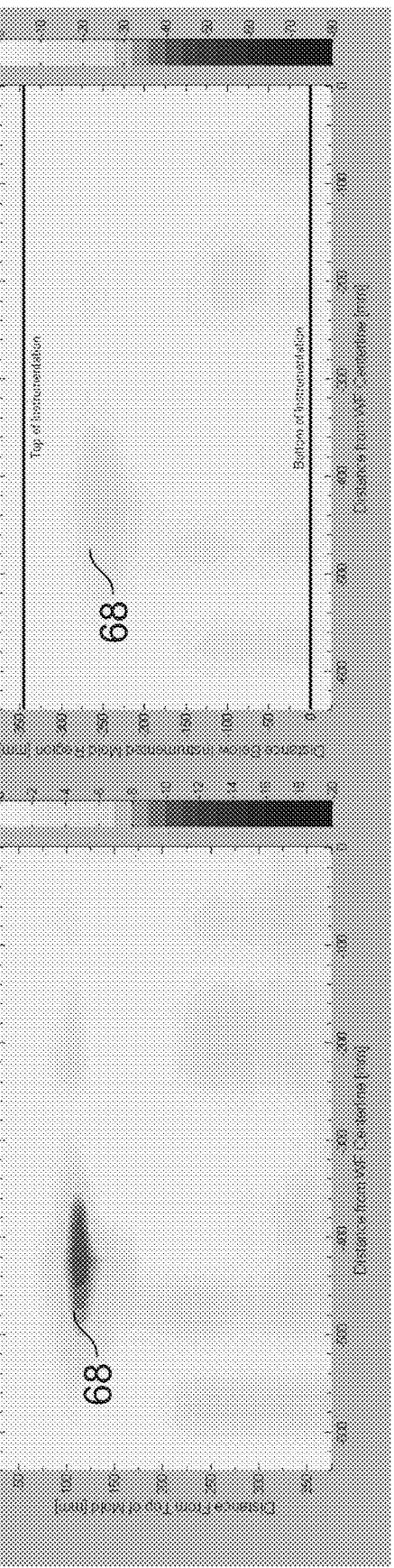
FIG. 6D
FIG. 6C

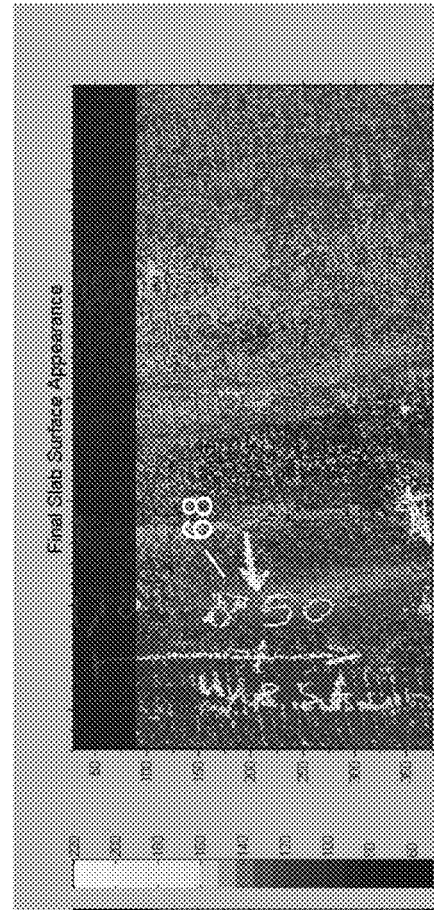
FIG. 7A
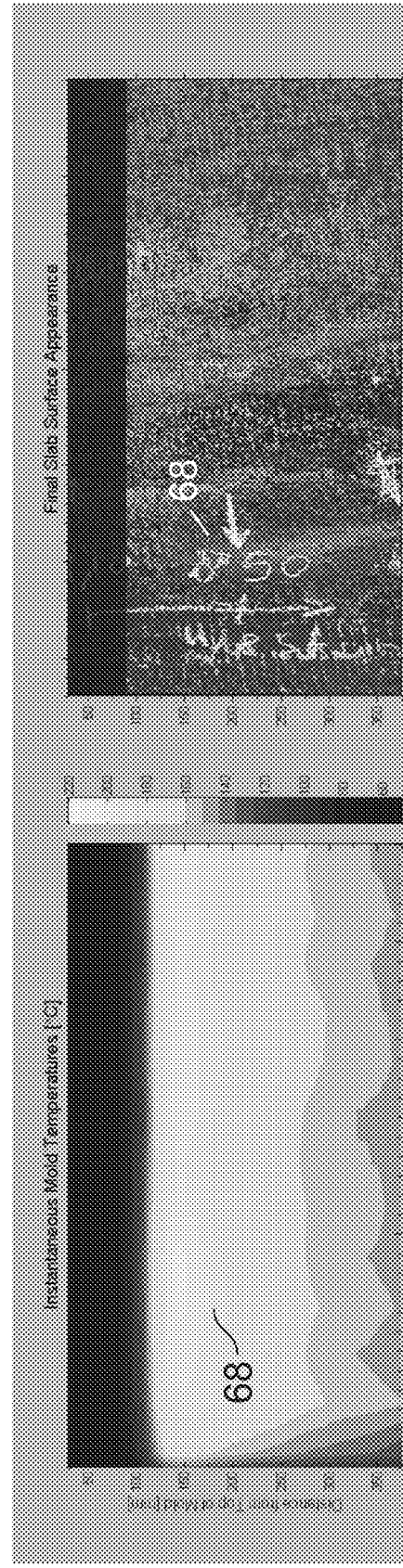
FIG. 7B
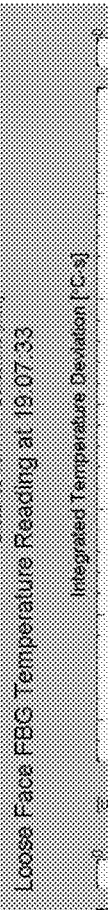
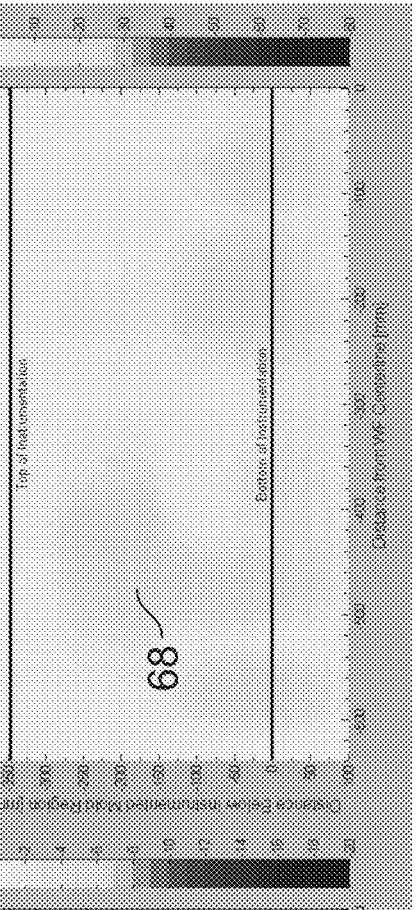
FIG. 7C
FIG. 7D

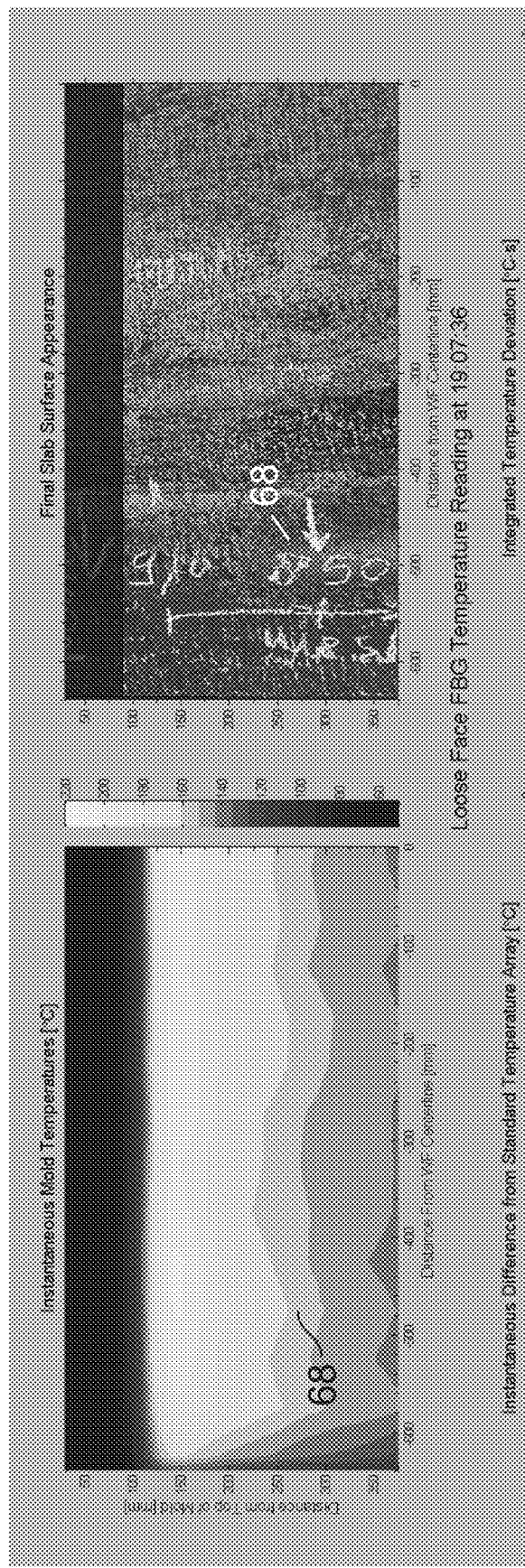
FIG. 8A
FIG. 8B
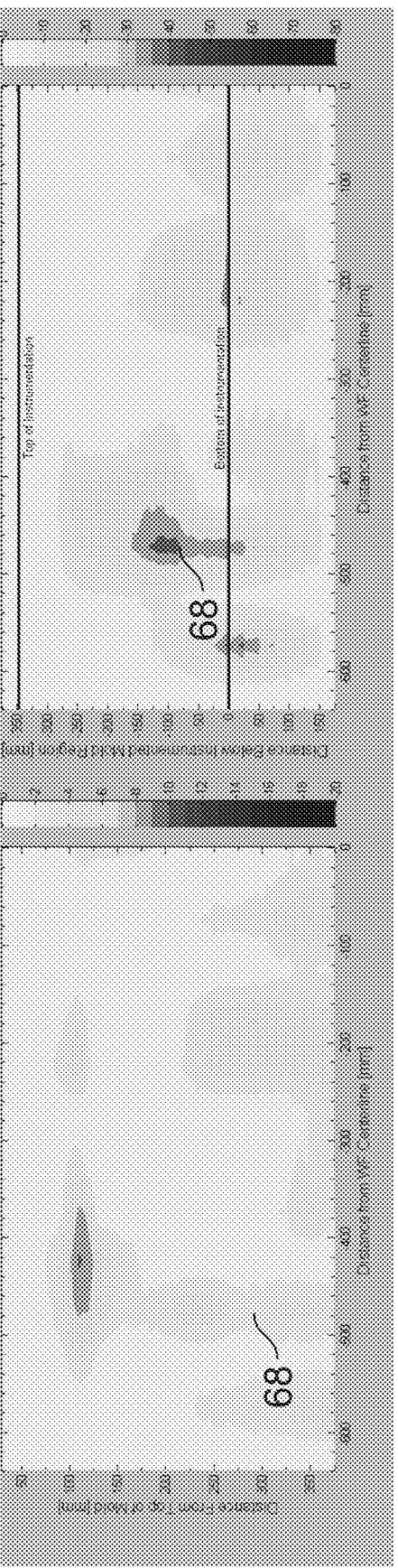
FIG. 8C
FIG. 8D

IDENTIFICATION OF VARIATIONS OR DEFECTS IN A SLAB MATERIAL, MADE FROM A CONTINUOUS CASTING PROCESS

CROSS-REFERENCE TO RELATED APPLICATIONS

This application claims priority under 35 U.S.C. § 119(e) to U.S. Provisional Patent Application Ser. No. 62/797,582 filed Jan. 28, 2019, which is incorporated herein in its entirety by reference.

FIELD

The present disclosure relates to systems, methods, and apparatuses that determine an integrated physical property deviation in a material made by a continuous manufacturing process. The material moves past a fixed equipment structure during the process, and sensors within the equipment structure measure data used to determine the integrated physical property deviation.

BACKGROUND

Many continuous manufacturing processes, such as the continuous casting of steel, occur in such harsh environments where data collection is difficult and often impossible. In many situations, direct data collection during the continuous manufacturing process is impossible, and even indirect data collection is difficult. Thus, the detection of defects formed during operation is extremely difficult and usually involves the interpretation of indirect measurements and data. For example, in the continuous casting of steel, one of the most important of the indirect methods is the measurement of temperature inside the mold of the continuous casting system. Current techniques for temperature measurement inside the mold typically involve monitoring the average heat flux based on the amount of heat absorbed by cooling water or based on embedded thermocouples in the copper walls of the mold. However, thermocouples have many problems such as interference from electromagnetics used in the vicinity and contact problems, so thermocouples provide only qualitative signals. Further still, thermocouples cannot be placed tightly together in close proximity without disrupting the heat transfer through the mold. Recently, Fiber Bragg Grating (FBG) temperature measurement systems have been placed into molds. FBG molds can measure very high density temperatures across the entire length and width of the mold, without disrupting heat transfer, and with better accuracy.

However, even with improved sensing, current data analysis and visualization of the data simply displays the raw temperature data or a simple variation thereof. Then, an operator views the data and identifies defects based on experience. There is obviously ample opportunity for human error with prior art systems. For instance, even an experienced operator may not detect a relatively small but consistent moving temperature drop that corresponds to a defect on a surface of the material.

SUMMARY

Systems, methods, and apparatuses are described herein that address the shortcomings of the prior art to better analyze and visualize data to help operators easily identify defects on a slab material made from a continuous manufacturing process. In some embodiments, the temperature data is tracked for specific locations on, or near to, the moving material surface over a time period to determine an integrated temperature deviation for each location. This integrated temperature deviation, in units of ° C.·s, shows where there is a temperature that is less than a standard temperature for a prolonged period, which is indicative of a defect. The integrated temperature deviation data simplifies the multiple sensor readings recorded over a time interval into a single value at each point on the moving material surface, and makes defects much more apparent for an operator, thus enabling the operator to take corrective action in real time, such as changing a parameter of the continuous manufacturing process or marking the defective portion of the slab so as to be set aside for further inspection or not to be sold.

It is an aspect of embodiments of the present disclosure to translate sensor readings taken inside the fixed equipment, such as temperature readings in a mold of the fixed equipment, to a set of corresponding sensor readings at locations on the moving material surface, while that surface is moving past the inner surface of the mold. At least two sensors are oriented with the direction of travel. Thus, at least two sensors can detect at least two temperatures for each location on the material surface, as the material surface moves past the sensors, including, a first temperature at a first time at the location of the first sensor and a second temperature at a second time at the location of the second sensor, etc. The readings from the sensors can be used, either directly or indirectly. As explained in detail below, these multiple sensor readings are mapped to a single location on the material surface, so that an integrated sensor value for the location can be determined over a time period to better visualize any defects.

It is a further aspect of embodiments of the present disclosure to determine an integrated temperature deviation for a location on a slab based on the temperature readings from the mold. The measured temperatures are first compared to a standard temperature, which can be developed from historical temperature data that resulted in defect-free slabs. Specifically, a temperature drop is calculated at each sensor location at the time instant when the material surface passes by that sensor. Then, a minimum is determined between zero and the difference between a temperature and a standard temperature to determine a temperature drop relative to the standard temperature. Next, the temperature drop versus time data is integrated between a beginning and end of a time period to determine an integrated temperature deviation for the location on the slab in units of ° C.·s. The determination can be made in a number of ways, for instance, a Riemann sum approximation or integration of a function associated with the temperature drops. The function could be, for example, a line or curve fit to the temperature drop versus time data.

It is another aspect of embodiments of the present disclosure to display the integrated temperature deviation for one or more locations on the surface of the slab that passes the instrumented region of the mold. In some embodiments, the display can visualize the integrated temperature deviation values for locations on the slab passing through the instrumented region as well as locations that have already passed through the instrumented region. In addition, a threshold value of integrated temperature deviation can be set by an operator or other person so that when the integrated temperature deviation for a location on the slab exceeds a predetermined value in units of ° C.·s, then the location will be marked on the display unit or the operator will otherwise be notified. In some instances, a lesser threshold can be set below the defect threshold. If the integrated temperature deviation meets or exceeds this lesser threshold, then an operator can be notified who can then alter a parameter of the manufacturing process such as material composition, processing speed, temperature, etc. Similarly, if the integrated temperature deviation meets or exceeds this lesser threshold, an electronic device can automatically alter a parameter of the manufacturing process to prevent the formation of a defect.

It is another aspect of embodiments of the present disclosure to display the integrated temperature deviation described above, in a display window, along with a second display window that contains time-varying photographs of the slab surface taken at the appropriate time, such as by a surface inspection system located after the caster exit that scans images of the as-cast, partially rolled sheet, or product prior to coiling. An operator can then evaluate possible defects on the visualized product surface using the corresponding temperature deviation map of that same region of the surface, in real time.

It will be appreciated that embodiments of the present disclosure can apply to a wide range of applications. For example, the continuous casting process can apply to any molten material passing through a mold. Even more generally, embodiments of the present disclosure can apply to a first material passing a second material where sensors can detect physical properties including, but not limited to, position, capacitance, color, electrical conductivity or impedance, luminescence, opacity, permeability, pressure, refractive index, specific heat, temperature, etc. Further still, embodiments of the present disclosure can apply to the manufacture of other materials such as plastic or ceramics made by other processes such as injection molding.

One particular embodiment of the present disclosure is a method for detecting defects in a manufacturing process, comprising: (i) moving a material past an equipment structure, wherein a plurality of sensors is positioned in the equipment structure and is configured to detect a local physical property, and wherein at least two sensors of the plurality of sensors are oriented in a direction of movement of the material; (ii) receiving, by an electronic device, data of the local physical properties from the plurality of sensors; (iii) determining, by the electronic device at each location and time in the equipment structure, a difference between the data of the local physical properties and standard data, which corresponds to data where no defects in the material are expected; (iv) determining, by the electronic device, an accumulated difference for each location on the material over a time period based on the difference between the data of the local physical properties and the standard data; and (v) displaying, by a display unit, a defect criterion of the accumulated difference at each location on the material for an operator to take corrective action, inspect and downgrade the material at locations having large magnitudes of the accumulated difference, and/or for forensic evaluation to investigate defects.

In some embodiments, the equipment structure is a continuous casting mold, and the local physical property is temperature. In various embodiments, the plurality of sensors comprises one of thermocouples or Fiber Bragg Sensors embedded in copper walls or coating layers of the continuous casting mold. In some embodiments, the data of the local physical properties at an inner surface of the equipment structure is mapped to a surface of the material for an arbitrary speed history of a relative movement between the material and the equipment structure to determine the difference between the data of the local physical properties and the standard data. In various embodiments, the defect criterion is the accumulated difference integrated over the time period. In some embodiments, the accumulated difference is integrated over the time period by integrating a function associated with the accumulated difference over the time period. In various embodiments, the accumulated difference is integrated over the time period by dividing the accumulated difference by the time period in a Riemann sum approximation.

Another particular embodiment of the present disclosure is a method for determining an integrated physical property deviation at a single location in a process to manufacture a product, comprising: (i) providing a first sensor and a second sensor in an instrumented region of a first material; (ii) moving a second material past the instrumented region of the first material, wherein the first sensor and the second sensor are each configured to detect a physical property, and the first sensor and the second sensor are aligned in a movement direction of the second material; (iii) detecting, by the first sensor at a first time, a first physical property of a first location of the first material that is proximate to a location on the second material when the second material is at a first position relative to the first material; (iv) determining, by an electronic device, a minimum of zero and a difference between the first physical property and a first standard physical property to provide a first physical property drop; (v) detecting, by the second sensor at a second time, a second physical property of a second location of the first material that is proximate to the location on the second material when the second material is at a second position relative to the first material; (vi) determining, by the electronic device, a minimum of zero and a difference between the second physical property and a second standard physical property to provide a second physical property drop; and (vii) determining, by the electronic device, an integrated physical property deviation at the location on the second material based on the first physical property drop, the first time, the second physical property drop, and the second time.

In various embodiments, the method further comprises (viii) integrating, by the electronic device, a function associated with the first physical property drop and the second physical property drop between the first time and the second time to determine the integrated physical property deviation. In some embodiments, the method further comprises (ix) adding, by the electronic device, the first physical property drop and the second physical property drop to determine an aggregate property drop; and (x) dividing, by the electronic device, the aggregate property drop by a difference between the first time and the second time to determine the integrated physical property deviation. In various embodiments, the first material defines a mold in a casting process, the second material is one of a metal, a plastic, or a fiberglass, and the second material moves past the mold in a continuous manufacturing process. In some embodiments, the first sensor and the second sensor are each temperature sensors, and the physical property is temperature. In various embodiments, the method further comprises (xi) displaying, on a display unit, the integrated physical property deviation as the second material moves past the first material. In some embodiments, the method further comprises (xii) moving the second material past the instrumented region of the first material according to an arbitrary speed history of a relative movement between the first material and the second material.

A further particular embodiment of the present disclosure is a system for determining an integrated temperature deviation in a manufacturing process, comprising: an equipment structure having a surface and an instrumented region positioned proximate to the surface; a material configured to move past the surface of the equipment structure in a movement direction; a first temperature sensor and a second temperature sensor positioned in the instrumented region of the equipment structure, wherein the first temperature sensor and the second temperature sensor are aligned in the movement direction; an electronic device operably connected to the first temperature sensor and to the second temperature sensor, and the electronic device having a non-transitory computer-readable medium comprising instructions executable by a processor to: (i) receive a first temperature determined by a reading from the first temperature sensor at a first time, wherein the first temperature is at a first location of the equipment structure that is proximate to a location of the material when the material is at a first position relative to the equipment structure; (ii) determine a minimum of zero and a difference between the first temperature and a first standard temperature to provide a first temperature drop; (iii) receive a second temperature determined by a reading from the second temperature sensor at a second time, wherein the second temperature is at a second location of the equipment structure that is proximate to the location of the material when the material is at a second position relative to the equipment structure; (iv) determine a minimum of zero and a difference between the second temperature and a second standard temperature to provide a second temperature drop; and (v) determine an integrated temperature deviation at the location on the material based on the first temperature drop, the first time, the second temperature drop, and the second time.

In some embodiments, the instructions are further executable by the processor to (vi) integrate a function associated with the first temperature drop and the second temperature drop between the first time and the second time to determine the integrated temperature deviation. In various embodiments, the instructions are further executable by the processor to: (vii) add the first temperature drop and the second temperature drop to determine an aggregate property drop; and (viii) divide the aggregate property drop by a difference between the first time and the second time to determine the integrated temperature deviation. In some embodiments, the system further comprises a display unit that displays the integrated temperature deviation as the material moves past the equipment structure. In various embodiments, the instructions are further executable by the processor to: (ix) compare the integrated temperature deviation to a first predetermined threshold, wherein if the integrated temperature deviation meets or exceeds the first predetermined threshold, then a parameter of the manufacturing process can be altered to prevent a defect at the location of the material. In some embodiments, the instructions are further executable by the processor to: (x) compare the integrated temperature deviation to a second predetermined threshold that is higher than the first predetermined threshold, wherein if the integrated temperature deviation meets or exceeds the second predetermined threshold, then a defect at the location of the material can be marked.

The Summary is neither intended nor should it be construed as being representative of the full extent and scope of the present disclosure. The present disclosure is set forth in various levels of detail in the Summary as well as in the attached drawings and the Detailed Description and no limitation as to the scope of the present disclosure is intended by either the inclusion or non-inclusion of elements or components. Additional aspects of the present disclosure will become more readily apparent from the Detailed Description, particularly when taken together with the drawings.

The above-described embodiments, objectives, and configurations are neither complete nor exhaustive. As will be appreciated, other embodiments of the disclosure are possible using, alone or in combination, one or more of the features set forth above or described in detail below.

The phrases "at least one," "one or more," and "and/or," as used herein, are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B, and C together.

Unless otherwise indicated, all numbers expressing quantities, dimensions, conditions, and so forth used in the specification and claims are to be understood as being modified in all instances by the term "about."

The term "a" or "an" entity, as used herein, refers to one or more of that entity. As such, the terms "a" (or "an"), "one or more," and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C. § 112(f). Accordingly, a claim incorporating the term "means" shall cover all structures, materials, or acts set forth herein, and all of the equivalents thereof. Further, the structures, materials, or acts and the equivalents thereof shall include all those described in the Summary, Brief Description of the Drawings, Detailed Description, Abstract, and claims themselves.

BRIEF DESCRIPTION OF THE DRAWINGS

The accompanying drawings, which are incorporated in and constitute a part of the specification, illustrate embodiments of the disclosure and together with the Summary given above and the Detailed Description of the drawings given below, serve to explain the principles of these embodiments. In certain instances, details that are not necessary for an understanding of the disclosure or that render other details difficult to perceive may have been omitted. It should be understood, of course, that the disclosure is not necessarily limited to the particular embodiments illustrated herein. Additionally, it should be understood that the drawings are not necessarily to scale.

FIG. 6A is a graph showing an instantaneous temperature map of measured mold sensor data at a first time according to an embodiment of the present disclosure;

FIG. 6B is a view of a surface of a slab proximate to the interior surface of the mold in FIG. 6A at the first time according to an embodiment of the present disclosure;

FIG. 6C is a graph showing a difference between the instantaneous temperature in FIG. 6A and a standard temperature, or temperature deviation, at the first time according to an embodiment of the present disclosure;

FIG. 6D is a graph showing an integrated temperature deviation of the slab material from FIG. 6B according to an embodiment of the present disclosure;

FIG. 7A is a graph showing an instantaneous temperature map of measured mold sensor data at a second time according to an embodiment of the present disclosure;

FIG. 7B is a view of a surface of a slab proximate to the interior surface of the mold in FIG. 7A at the second time according to an embodiment of the present disclosure;

FIG. 7C is a graph showing a difference between the instantaneous temperature in FIG. 7A and a standard temperature, or temperature deviation, at the second time according to an embodiment of the present disclosure;

FIG. 7D is a graph showing an integrated temperature deviation of the slab material from FIGS. 6B and 7B according to an embodiment of the present disclosure;

FIG. 8A is a graph showing an instantaneous map of measured mold sensor data at a third time according to an embodiment of the present disclosure;

FIG. 8B is a view of a surface of a slab proximate to the interior surface of the mold in FIG. 8A at the third time according to an embodiment of the present disclosure;

FIG. 8C is a graph showing a difference between the instantaneous temperature in FIG. 8A and a standard temperature, or temperature deviation, at the third time according to an embodiment of the present disclosure;

FIG. 8D is a graph showing an integrated temperature deviation of the slab material from FIGS. 6B, 7B, and 8B according to an embodiment of the present disclosure;

Figure 1:
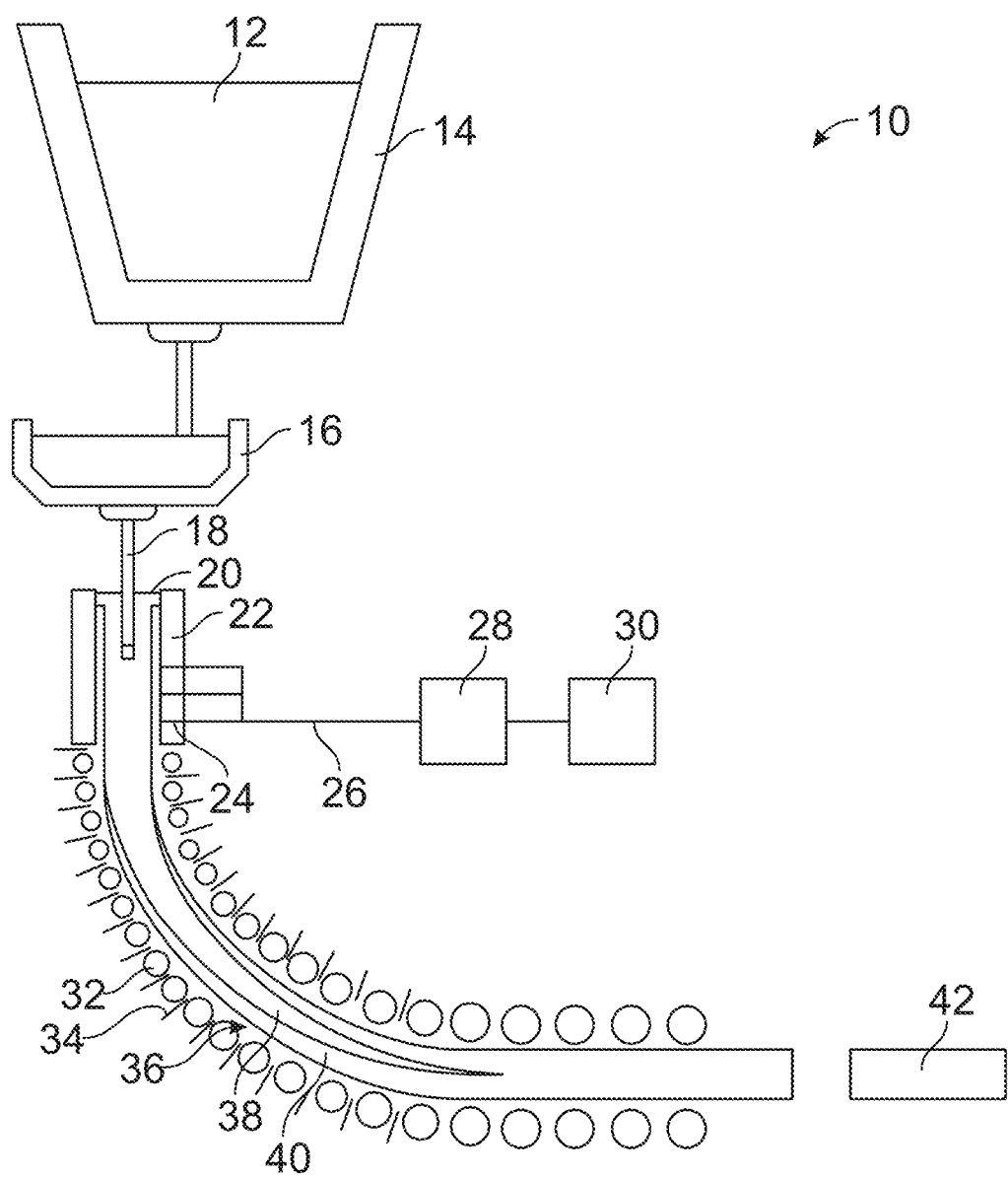
FIG. 1 is an elevation view of a continuous casting system according to an embodiment of the present disclosure.

Similar components and/or features may have the same reference label. Further, various components of the same type may be distinguished by following the reference label by a letter that distinguishes among the similar components. If only the first reference label is used, the description is applicable to any one of the similar components having the same first reference label irrespective of the second reference label.

A list of the various components shown in the drawings and associated numbering is provided herein:

| Number | Component |
| --- | --- |
| 10 | Continuous Casting System |
| 12 | Molten Steel |
| 14 | Ladle |
| 16 | Tundish |
| 18 | Nozzle |
| 20 | Meniscus |
| 22 | Mold |
| 24 | Sensor |
| 26 | Line |
| 28 | Electronic Device |
| 30 | Display |
| 32 | Roller |
| 34 | Cooling Spray |
| 36 | Slab Material |
| 38 | Liquid Portion |
| 40 | Solid Portion |
| 42 | Discrete Slab |
| 44 | Narrow Face |
| 46 | Wide Face |
| 48 | Uncast Slab |
| 50 | Mold Top |
| 52 | Mold Bottom |
| 54 | Instrumented Region |
| 56 | Interior Surface |
| 58 | Receive First Physical Property |
| 60 | Determine First Physical Property Drop |
| 62 | Receive Second Physical Property |
| 64 | Determine Second Physical Property Drop |
| 66 | Determine Integrated Temperature Deviation |
| 68 | Location on Slab Surface |

DETAILED DESCRIPTION

The present disclosure has significant benefits across a broad spectrum of endeavors. It is the Applicant's intent that this specification and the claims appended hereto be accorded a breadth in keeping with the scope and spirit of the disclosure being disclosed despite what might appear to be limiting language imposed by the requirements of referring to the specific examples disclosed. To acquaint persons skilled in the pertinent arts most closely related to the present disclosure, a preferred embodiment that illustrates the best mode now contemplated for putting the disclosure into practice is described herein by, and with reference to, the annexed drawings that form a part of the specification. The exemplary embodiment is described in detail without attempting to describe all of the various forms and modifications in which the disclosure might be embodied. As such, the embodiments described herein are illustrative, and as will become apparent to those skilled in the arts, may be modified in numerous ways within the scope and spirit of the disclosure.

Although the following text sets forth a detailed description of numerous different embodiments, it should be understood that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims. To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning.

Various embodiments of the present disclosure are described herein and as depicted in the drawings. It is expressly understood that although the figures depict continuous casting processes, molds, and slabs and methods and systems for using the same, the present disclosure is not limited to these embodiments.

Now referring to FIG. 1, an elevation view of a continuous casting system 10 is provided. In this exemplary embodiment, molten steel 12 fills a ladle 14 at a top side of the system 10. Some of the molten steel 12 exits the ladle 14 to fill a tundish 16, which holds enough molten steel 12 to provide a continuous flow of steel during the continuous casting process. A nozzle 18 extends from a bottom side of the tundish 16 to direct molten steel 12 into a mold 22, which begins to solidify the molten steel 12 into a slab material 36. A meniscus 20 is where the initial solidification of the steel occurs and is found at the at the junction where the top of a solid portion of the steel meets the mold 22 and the liquid portion.

Multiple sensors 24 are positioned in the mold 22 to detect temperatures within the mold 22. Dense temperature measurements are possible in the mold 22 with, for example, Fiber Bragg Gratings, which can measure temperature at more than 2000 locations within the mold 22 using fibers embedded inside copper plates. As explained in detail below, a reduction in temperature within the mold 22, or reduction in heat flux between the mold 22 and the slab material 36 often indicates a depression, a crack, or other defects that can compromise the integrity of the resulting slab material 36. An electronic device 28 is operably connected to the sensors 24 by, for instance, a wired connection 26. The electronic device 28 can have a non-transitory computer-readable medium comprising instructions executable by a processor to perform various actions described herein. A display 30 is also in operable communication with the electronic device 28 to display data such as an integrated temperature deviation in units of ° C.·s and/or other information received from the electronic device 28.

After contacting and passing the mold 22, an outer surface of the slab material 36 begins to increasingly solidify, and a solid portion 40 of the slab material 36 grows while a liquid portion 38 of the slab material 36 shrinks. Rollers 32 guide the slab material 36 from a vertical orientation out of the mold 22 to a horizontal orientation for further processing, such as cutting the slab material 36 into discrete slabs 42. A cooling spray 34 can also advance the cooling process of the slab material 36 as the slab material 36 moves out of the mold 22.

Figure 2:
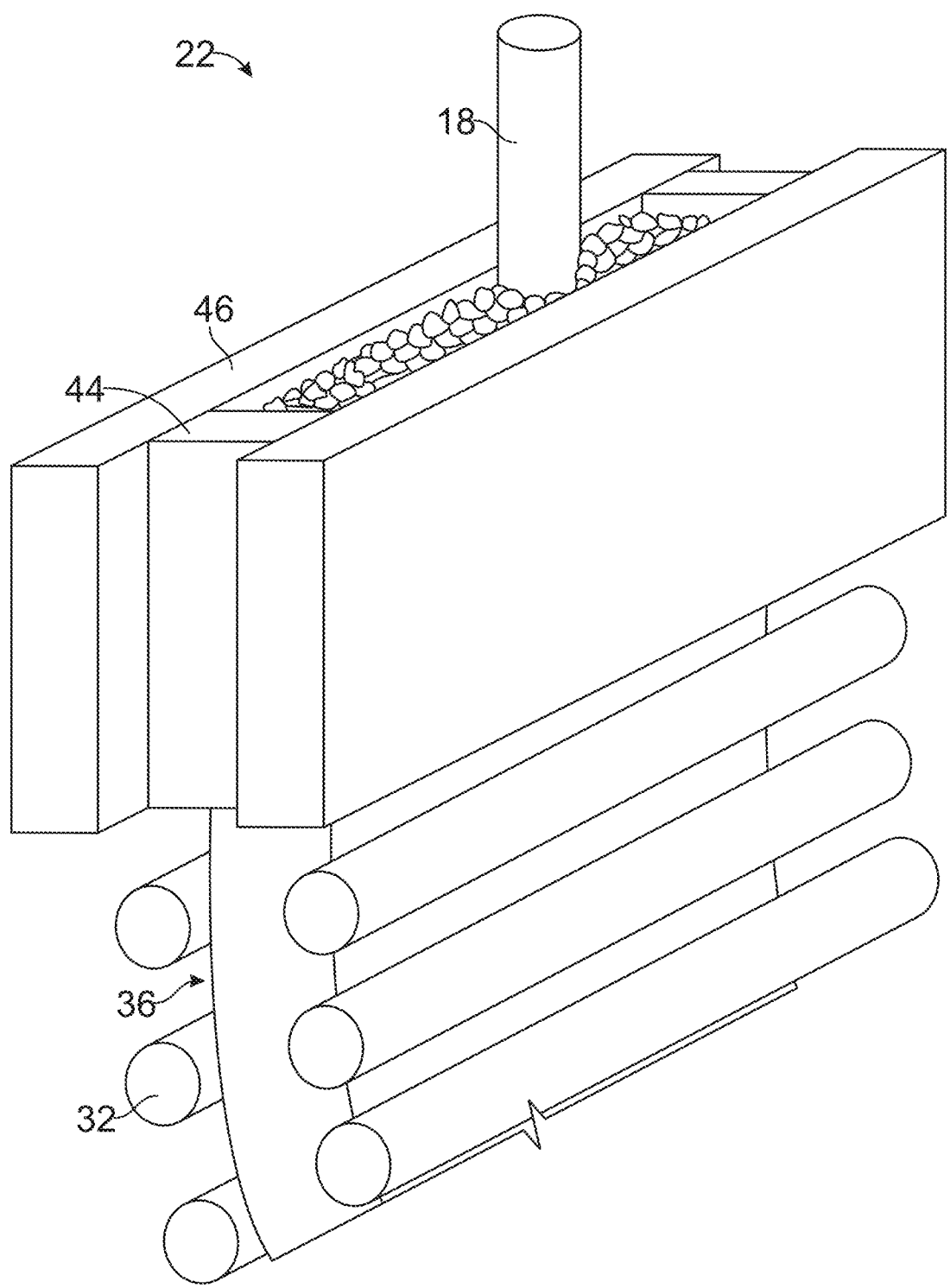
FIG. 2 is a perspective view of a mold and moving slab material of a continuous casting system according to an embodiment of the present disclosure.

Now referring to FIG. 2, a perspective view of the mold 22 is provided. The nozzle 18 directs molten steel into the mold 22, which in this embodiment has a rectangular cross section defined by two wide face sides 46 and two narrow face sides 44. It will be appreciated that the mold 22 can have other cross sectional shapes and different arrangements of faces 44, 46 while being encompassed by embodiments of the present disclosure.

Figure 3:
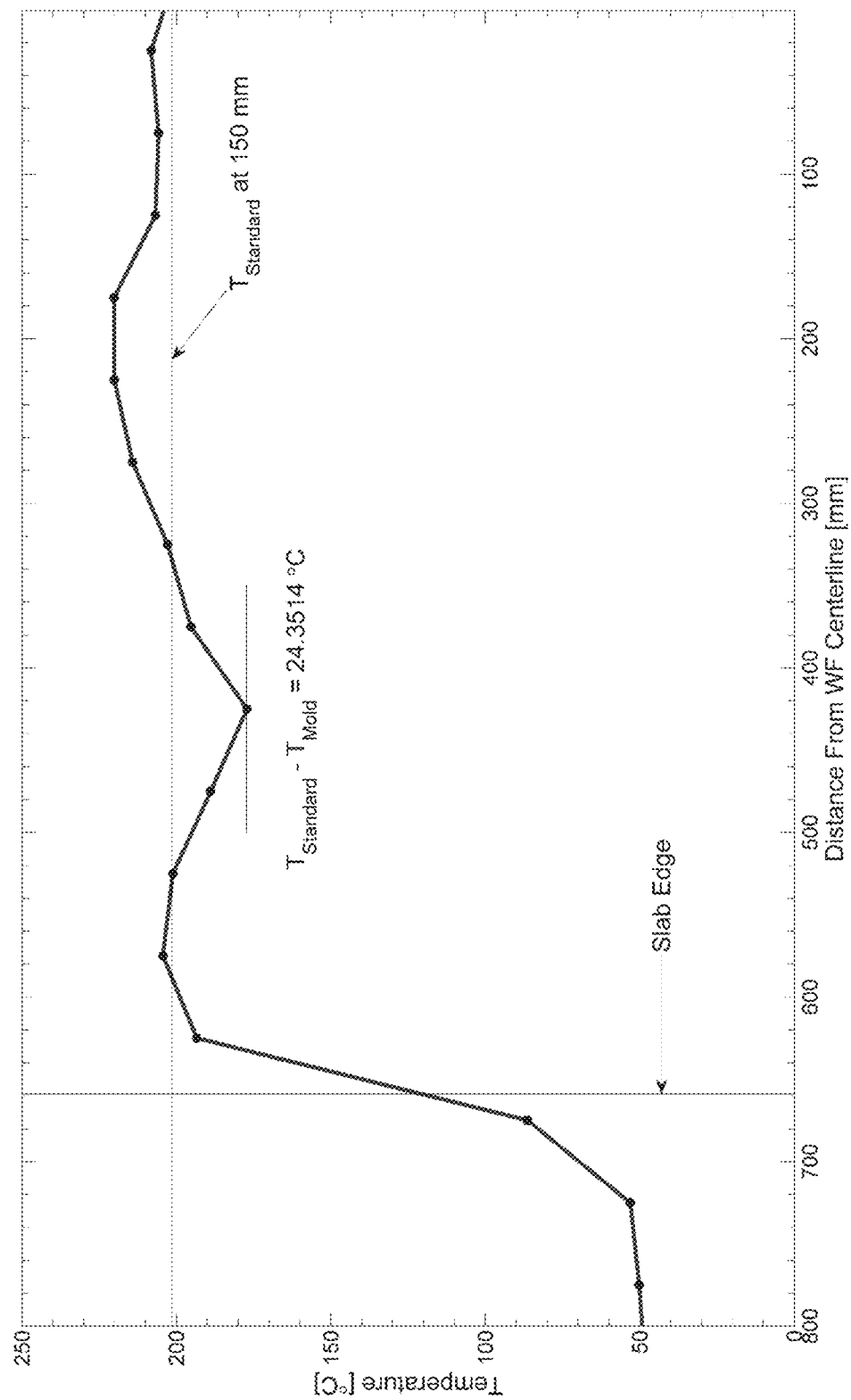
FIG. 3 is a graph showing temperatures inside of a mold according to an embodiment of the present disclosure.

Now referring to FIG. 3, a graph showing temperatures inside a wide face of a mold is provided. The temperatures in FIG. 3 are taken at a horizontal plane 150 mm below the meniscus, and the temperatures are presented from a centerline to a slab edge, or to an interior surface of a narrow face of the mold. Over time, a historical or standard temperature data set can be developed for different interior surfaces within the mold. These standard temperatures represent a temperature profile within the mold that results in a defect-free slab. As indicated in FIG. 3, a temperature drop below the standard temperature ($T_{Standard} - T_{Mold}$) is of particular interest as this represents a possible defect in the slab material.

Specifically, this temperature drop close to the interior surface of the mold represents a reduction in heat transfer within the mold region, which leads to elevated temperatures on the surface of the slab. These defects typically form close to the meniscus, and grow as they move vertically down the mold at the casting speed. Therefore, at least two sensors oriented in the movement direction of the slab material can detect temperatures at a single location on the slab over a period of time, which can then be used to determine an integrated temperature deviation at that single location.

Figure 4:
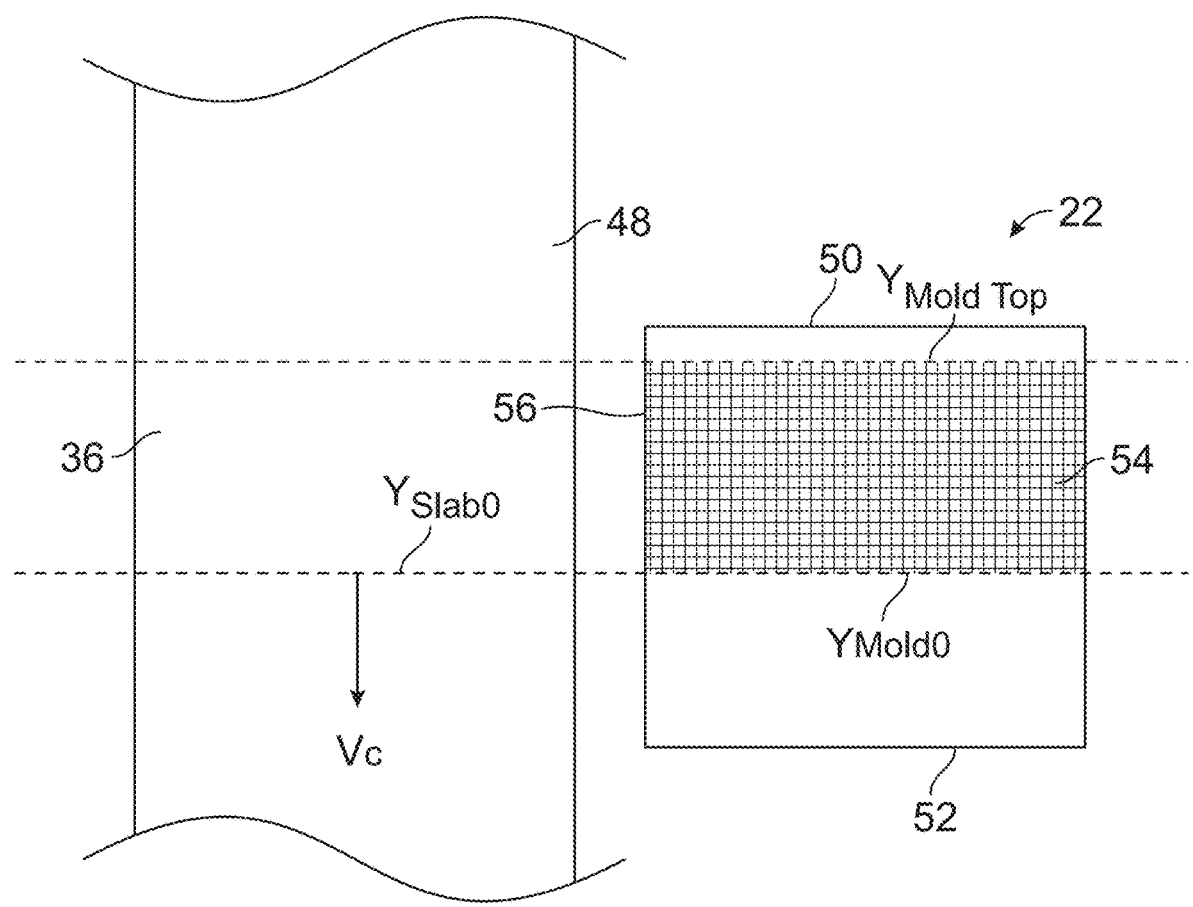
FIG. 4 is an elevation view of a spatial relationship between a moving slab material (left) and an instrumented region of a mold (right) according to an embodiment of the present disclosure.

Now referring to FIG. 4, an elevation view of a spatial relationship between the slab material 36 and a mold 22 is provided. The mold 22 extends between a top surface 50 and a bottom surface 52, and the uncast portion 48 of the molten steel moves toward the mold 22 to form the slab material 36. The uncast portion 48 begins to solidify upon reaching the mold 22, and the slab material 36 continuously moves past an interior surface 56 of the mold 22. Each intersection of lines of the instrumented region 54 represents a sensor, and data collected from the sensors within the mold 22 can then be used to determine temperatures at the interior surface 56 of the mold 22. In order to track the integrated temperature deviation at a given location on the moving slab material 36, a coordinate system is established to map temperatures at the interior surface 56 of the mold 22 to locations on the slab material 36.

To translate or map temperature readings or data from the mold 22 to the slab material 36, there is a unique spatial and temporal mapping of mold temperature data $T_{Mold}$ ($x_{Mold}$, $y_{Mold}$, t), to slab temperature, $T_{Slab}$ ($x_{Slab}$, $y_{Slab}$, t), according to the time, location, and casting speed history. $y_{Mold}$, is the distance up the mold subsurface from the reference location, $y_{Mold0}$, which is located at the bottom of the instrumented region 54 where temperature data is measured. $y_{Slab}$ is distance along the slab material 36, opposite to the casting direction, from $y_{Slab0}$, which is a reference location fixed on the slab material 36 that aligns with the bottom of the instrumented region 54 at the reference starting time, ($y_{Slab} = y_{Mold}$ at $t = t_0$). For a given mold 22, the horizontal locations on the slab material 36 and mold 22, measured from a fixed horizontal reference such as the mold centerline, are identical, $x_{Slab} = x_{Mold}$.

At any given time, t, the vertical location of any specific location down the slab surface, $y_{Slab}$, is related to the point in the mold it is currently adjacent to, $y_{Mold}$, according to:

$$y_{Slab}(t) = y_{Mold} + \int_{t_0}^{t} V_c(t_i) dt_i \quad (1)$$

where the last term in this equation is the vertical distance traveled downward by the slab location since the reference starting time at $t_0$, and $V_c$, is the casting speed, which also may vary with time. For a constant casting speed Equation (1) simplifies to:

$$y_{Slab}(t) = y_{Mold} + V_c \cdot (t - t_0) \quad (2)$$

Mapping mold temperature to slab temperature, according to Equation (1) gives:

$$T_{Slab}(x_{Slab}, y_{Slab}, t) = T_{Mold}(x_{Mold}, y_{Mold} + \int_{t_0}^{t} V_c(t_i) dt_i, t) \quad (3)$$

The following defect criterion helps to identify cracks and other defects associated with longitudinal depressions by indicating regions on the slab surface that have experienced multiple, or prolonged, periods of temperature drops relative to the standard profile. The drop in the current temperature at any given measured point in the mold subsurface, relative to the standard temperature at that location is:

$$\Delta T(t) = \min(0, T_{Mold}(x_{Mold}, y_{Mold}, t) - T_{Standard}(x_{Mold}, y_{Mold}) + a) \quad (4)$$

where $T_{Standard}$ is a 2D array of standard temperatures at the instrumented points of the mold 22, calculated previously by averaging data when no defects occurred, according to the given steel grade and casting conditions. The constant, a, is a threshold value that could be used to filter random variations in T, and a is currently set to 0. The defect criterion in this embodiment ignores temperature increases, because they are not believed to help heal any defect that may have formed. However, embodiments of the present disclosure encompass systems and methods that consider temperature increases as well. Inserting Equation (3) into Equation (4) gives:

$$\Delta T(t) = \min(0, T_{Mold}(x_{Slab}, y_{Slab} - \int_{t_0}^{t} V_c(t_i) dt_i, t) - T_{Standard}(x_{Slab}, y_{Slab} - \int_{t_0}^{t} V_c(t_i) dt_i)) \quad (5)$$

While a location of interest on the slab surface, $y_{Slab}$, is within the instrumented region 54 of the mold 22, $t_{Enter} < t < t_{Exit}$, the defect criterion, $T_{IDrop}$, also called "integrated physical property deviation", evolves with time by integrating the history of the temperature drop at that moving location:

$$T_{IDrop}(x_{Slab}, y_{Slab}, t) = \int_{t_{Enter}}^{t} \Delta T(t_i) dt_i \quad (6)$$

where $t_{Enter}$ is the time when the location, $y_{Slab}$, enters the instrumented region 54, $y_{Slab} = y_{Moldtop}$. This time is typically known from recorded data for the slab, heat, and time and can also be calculated using the reference time, $t_0$, the length of the instrumented region 54, $y_{MoldTop} - y_{Mold0}$, and the casting speed history:

$$y_{Slab} - y_{MoldTop} = \int_{t_0}^{t_{Enter}} V_c(t_i) dt_i \quad (7)$$

For a constant casting speed, this simplifies to:

$$t_{Enter} = t_0 + \frac{y_{Slab} - y_{MoldTop}}{V_c} \quad (8)$$

Once the location of interest, $y_{Slab}$, passes out of the instrumented region 54, $y_{Slab} \geq y_{Mold0}$, at time, $t \geq t_{Exit}$, $T_{IDrop}(x_{Slab}, y_{Slab}, t)$ has reached its final value and is no longer time dependent, $T_{IDropF}(x_{Slab}, y_{Slab})$ is found by setting $t = t_{Exit}$ in Equation 6, where $t_{Exit}$ is the time when the location of interest reaches the last instrumented point in the mold 22.

$$y_{Slab} - y_{MoldTop} = \int_{t_{Enter}}^{t_{Exit}} V_c(t_i) dt_i \quad (9)$$

For a constant casting speed, and knowing $t_{Enter}$ from Equation (7), Equation (9) simplifies to:

$$t_{Exit} = t_{Enter} + \frac{y_{MoldTop} - y_{Mold0}}{V_c} \quad (10)$$

These equations are well suited for computational implementation. For an arbitrary casting speed history, Equations (7) and (9) each require solving a definite integral for the upper integration limit. This is readily accomplished with an incremental time-marching procedure. Similarly, Equation 6 can be represented as a summation:

$$T_{IDrop}(x_{Slab}, y_{Slab}, t) = \sum_{t=t_{Enter}}^{t_{Exit}} \Delta T(t) \quad (11)$$

and after substituting Equation (5) into Equation (11) gives:

$$T_{IDropF}(x_{Slab}, y_{Slab}, t) = \sum_{t=t_{Enter}}^{t_{Exit}} \min(0, T_{Mold}(x_{Slab}, y_{Slab} - \int_{t_0}^{t} V_c(t_i) dt_i, t) - T_{Standard}(x_{Slab}, y_{Slab} - \int_{t_0}^{t} V_c(t_i) dt_i)) \quad (12)$$

The definite integrals contained within Equation (12) can again be solved incrementally. As Equation (11) is evaluated for a location of interest, $y_{Slab}$, at increasing time, t, (using constant time steps of 1 s in this work) the value of $T_{IDrop}$ at each point on the slab surface, starting at zero, evolves with time while moving through the instrumented region, and retains its final value upon exiting that region, $T_{IDropF}$.

Figure 5:
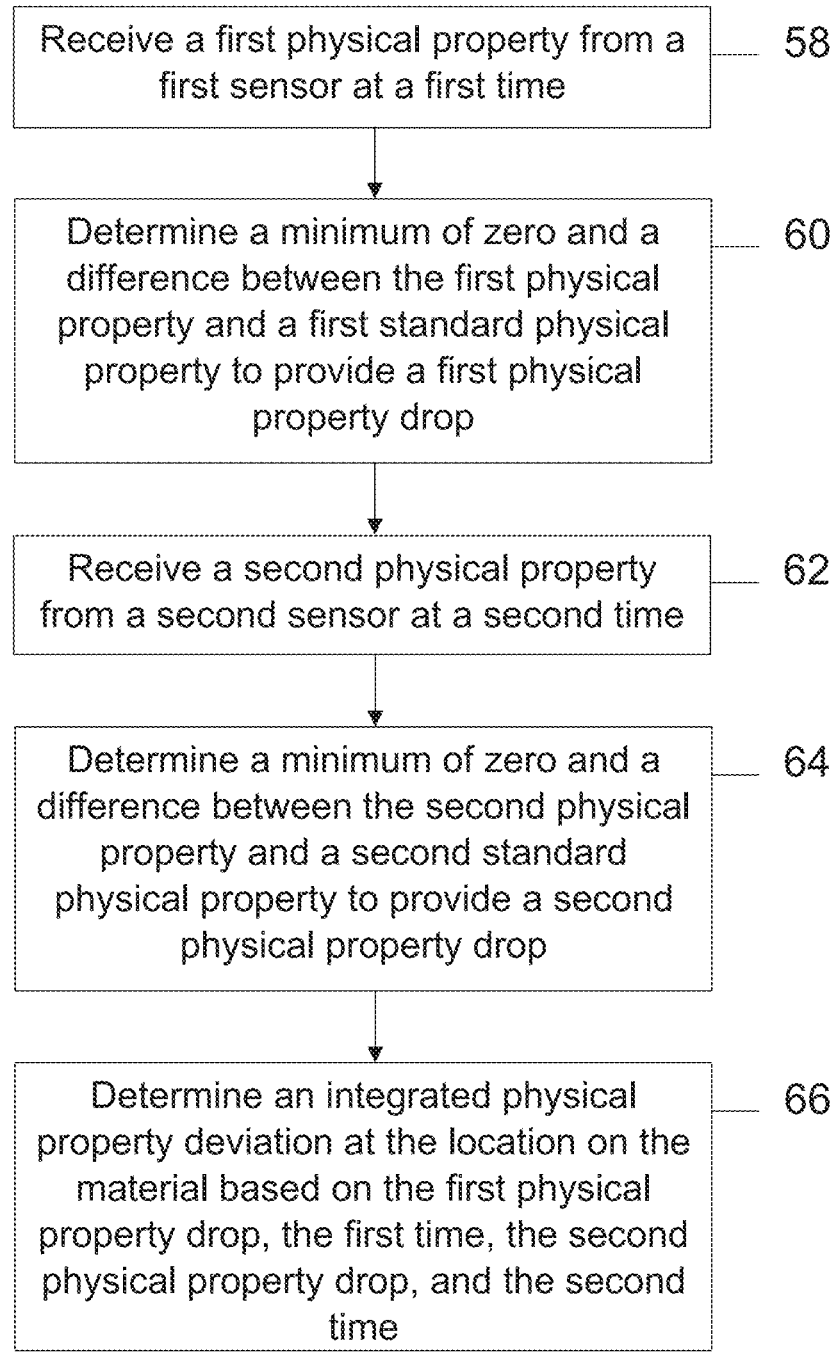
FIG. 5 is a flowchart of an exemplary process for determining an integrated temperature deviation for a location on a slab material according to an embodiment of the present disclosure.

Now referring to FIG. 5, an exemplary flowchart for determining an integrated temperature deviation is provided. An electronic device can have a non-transitory computer-readable medium comprising instructions executable by a processor to perform various actions herein. As discussed above, the first physical property of a location on the slab material is received 58, and a first physical property drop is determined 60. It will be appreciated that at a given point in time, the first sensor can determine the first physical property, or for example, the first physical property can be derived from readings from the first sensor. In this sense, the first and second sensors are aligned with the direction of travel of the slab material to discern different physical property values at the same location on the slab material as the slab material moves past an instrumented region over a time period. Next, the second physical property of the same location on the slab material is received 62, and a second physical property drop 64 is determined. Based on the two physical property drops and the times at which these readings were taken, an integrated physical property deviation can be determined 66 for the same location on the slab material. It will be appreciated that an electronic device can perform any of these and other actions in any order. It will also be appreciated that the process may be repeated for as many sensors as exist in the direction of movement.

FIGS. 6A-9D show a sequence of different readings as a slab material, and a location 68 on the slab material, pass through an instrumented region of a mold. FIGS. 6A-6D are readings taken at a first time, FIGS. 7A-7D are readings taken at a second time, FIGS. 8A-8D are readings taken at a third time, and FIGS. 9A-9D are readings taken at a fourth time. FIGS. 6A-6D are discussed below, but it will be appreciated that the explanation for FIG. 6A applies to FIGS. 7A, 8A, and 9A; the explanation for FIG. 6B applies to FIGS. 7B, 8B, and 9B; the explanation for FIG. 6C applies to FIGS. 7C, 8C, and 9C; and the explanation for FIG. 6D applies to FIGS. 7D, 8D, and 9D.

An example of an instantaneous snapshot of all of the measured data recorded in one wide face of the mold, using a continuous, blackbody, temperature map is shown in FIG. 6A. This temperature map provides a more direct local indication of heat transfer across the interfacial gap. However, the 2D contour plot creates a new problem, as the operator is challenged to perceive any important differences between the current values and threshold limits which cannot easily be displayed, as the relevant information needed from the plot to evaluate behavior of the material evolves in real-time in both time and space.

To resolve this problem, the current work proposes a direct portrayal of the differences between the current and standard conditions, magnified to facilitate the visualization of defect formation. This is difficult for several reasons. In display of the current signal, one might be tempted to filter out the noise (small fluctuations in temperature), to make real "large" variations easier to perceive. However, some of the small changes actually contribute valuable information. The second challenge is to find a reasonable set of standard conditions, as displaying a range is no longer an option.

FIGS. 6A-6D show a display for defect analysis using this new defect indicator applied on half of the continuously cast slab. FIGS. 6A-6C share a common y-axis spanning the 345 mm instrumented region within the mold, while this same region is represented between the thick horizontal lines in FIG. 6D. FIG. 6A shows the instantaneous contour map in the instrumented region collected by the sensors at the current time, using the blackbody color map without interpolation. It is important that this contour map use strictly linear interpolation, because other methods risk creating artificial over- and under-shoots of the data. These extrema may accidentally wash out issues with sensors or other problems and distract from the more subtle changes which are the real temperature deviations.

FIG. 6B shows a top plan view of the final surface appearance of the region of the cast slab corresponding to the temperatures in FIG. 6A at the time it was proximate to the instrumented region in the mold. The translucent gray rectangle at the top indicates that portion of the image which was above the meniscus level at that time. While this image requires careful reconstruction, seeing how the measured temperatures line up with eventual surface quality problems is a helpful means of using this methodology to elucidate how defects form. Once this has been accomplished, and the results map in FIG. 6D has been determined to properly indicate defects, according to downstream product evaluations, then a real-time version of this display in the mold can be created, without FIG. 6B. This would enable operators to make decisions in real time to correct evolving surface defects apparent in the results map. Additionally, instead of eliminating FIG. 6B in the display window, including a surface reconstruction scan taken by an inspection device located somewhere closer to exit of the mold could be included to allow confirmation of surface problems predicted by the model.

FIG. 6C shows a linearly interpolated contour plot of the instantaneous deviations between the standard and current temperatures for each location in the array. Values on this plot always have a negative or zero value, as discussed previously. Zero indicates that temperature history experienced at that location was within the specified threshold of the standard temperature profile. Increasingly negative values indicate larger temperature drops.

Figures 9A, 9B, 9C, 9D:
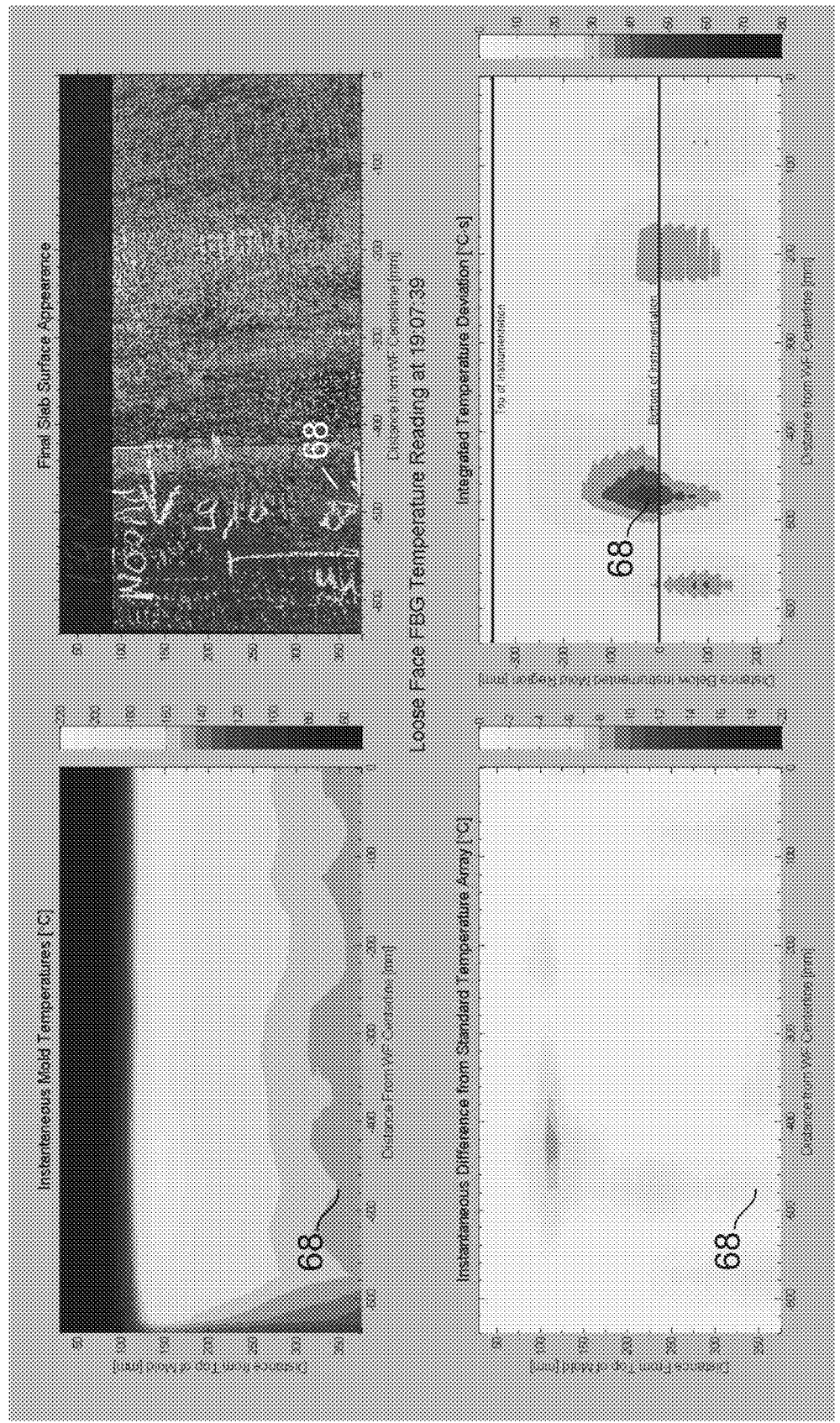
FIG. 9A is a graph showing an instantaneous temperature map of measured mold sensor data at a fourth time according to an embodiment of the present disclosure.
FIG. 9B is a view of a surface of a slab proximate to the interior surface of the mold in FIG. 9A at the fourth time according to an embodiment of the present disclosure.
FIG. 9C is a graph showing a difference between the instantaneous temperature in FIG. 9A and a standard temperature, or temperature deviation, at the fourth time according to an embodiment of the present disclosure.
FIG. 9D is a graph showing an integrated temperature deviation of the slab material from FIGS. 6B, 7B, 8B, and 9B according to an embodiment of the present disclosure.

FIG. 6D shows an example of the output results from this methodology, obtained by accumulating the results in FIG. 6C for a time period, according to the new defect criterion function in Equation (6). The time period spent within the instrumented region of the mold is represented by the space between the thick black horizontal lines labeled top and bottom of instrumentation. Once a surface location passes out of the instrumented region, the contours are fixed, and the calculation for that surface point is completed. Values in this contour plot also take on a negative or zero value, where increasingly negative numbers indicate higher likelihood of surface quality problems. The longitudinal depression at the location 68 in FIG. 9D is clearly visualized, while it is hardly noticeable in the raw temperature data in FIG. 6A, 7A, 8A, or 9A.

For online operation in real time, a streaming image taken with laser or optical scanners (either of the slab surface shape exiting the caster, or of coil prior to rolling) might be matched with the corresponding mold temperature images taken previously and offset, and be used to evaluate quality and dispositioning (shipping or downgrading) of the steel product. The new images showing the integrated temperature drops could be helpful in the determination of slab or coil downgrading.

This method tracks small temperature changes, so the standard profiles are very sensitive to casting conditions: grade being cast, casting speed, superheat, mold powder, mold geometry, and flow conditions, which vary from caster to caster. In addition to careful tracking and updating of the averages which represent standard conditions, natural variations not related to defect formation may need to be filtered, which would require adjusting the threshold temperature drop, a.

Depending on the depth and response time of the temperature sensors, further tuning may be needed to implement this methodology into a given steel plant. The new field variable, $T_{IDropF}$, requires sufficiently high density thermal data collection in the mold to capture the thermal signature of the slab surface defects.

The description of the present disclosure has been presented for purposes of illustration and description, but is not intended to be exhaustive or limiting of the disclosure to the form disclosed. Many modifications and variations will be apparent to those of ordinary skill in the art. The embodiments described and shown in the figures were chosen and described in order to best explain the principles of the disclosure, the practical application, and to enable those of ordinary skill in the art to understand the disclosure.

While various embodiments of the present disclosure have been described in detail, it is apparent that modifications and alterations of those embodiments will occur to those skilled in the art. Moreover, references made herein to "the present disclosure" or aspects thereof should be understood to mean certain embodiments of the present invention and should not necessarily be construed as limiting all embodiments to a particular description. It is to be expressly understood that such modifications and alterations are within the scope and spirit of the present disclosure, as set forth in the following claims.

The invention claimed is:

1. A method for detecting defects in a manufacturing process, comprising:
    moving a material past an equipment structure, wherein a plurality of sensors is positioned in said equipment structure and is configured to detect a local physical property, and wherein at least two sensors of said plurality of sensors are oriented in a direction of movement of said material;
    receiving, by an electronic device, data of said local physical properties from said plurality of sensors;
    determining, by said electronic device at each location and time in said equipment structure, a difference between said data of said local physical properties and standard data, which corresponds to data where no defects in said material are expected;
    determining, by said electronic device, an accumulated difference for each location on said material over a time period based on said difference between said data of said local physical properties and said standard data; and
    displaying, by a display unit, a defect criterion of said accumulated difference at each location on said material for an operator to take corrective action, inspect and downgrade said material at locations having large magnitudes of said accumulated difference, and/or for forensic evaluation to investigate defects.

2. The method of claim 1, wherein said equipment structure is a continuous casting mold, and said local physical property is temperature.

3. The method of claim 2, wherein said plurality of sensors comprises one of thermocouples or Fiber Bragg Sensors embedded in copper walls or coating layers of said continuous casting mold.

4. The method of claim 1, wherein said data of said local physical properties at an inner surface of said equipment structure is mapped to a surface of said material for an arbitrary speed history of a relative movement between said material and said equipment structure to determine said difference between said data of said local physical properties and said standard data.

5. The method of claim 1, wherein said defect criterion is said accumulated difference integrated over said time period.

6. The method of claim 5, wherein said accumulated difference is integrated over said time period by integrating a function associated with said accumulated difference over said time period.

7. The method of claim 5, wherein said accumulated difference is integrated over said time period by dividing said accumulated difference by said time period in a Riemann sum approximation.

8. A method for determining an integrated physical property deviation at a single location in a process to manufacture a product, comprising:
providing a first sensor and a second sensor in an instrumented region of a first material;
moving a second material past said instrumented region of said first material, wherein said first sensor and said second sensor are each configured to detect a physical property, and said first sensor and said second sensor are aligned in a movement direction of said second material;
detecting, by said first sensor at a first time, a first physical property of a first location of said first material that is proximate to a location on said second material when said second material is at a first position relative to said first material;
determining, by an electronic device, a minimum of zero and a difference between said first physical property and a first standard physical property to provide a first physical property drop;
detecting, by said second sensor at a second time, a second physical property of a second location of said first material that is proximate to said location on said second material when said second material is at a second position relative to said first material;
determining, by said electronic device, a minimum of zero and a difference between said second physical property and a second standard physical property to provide a second physical property drop; and
determining, by said electronic device, an integrated physical property deviation at said location on said second material based on said first physical property drop, said first time, said second physical property drop, and said second time.

9. The method of claim 8, further comprising integrating, by said electronic device, a function associated with said first physical property drop and said second physical property drop between said first time and said second time to determine said integrated physical property deviation.

10. The method of claim 8, further comprising:
adding, by said electronic device, said first physical property drop and said second physical property drop to determine an aggregate property drop; and
dividing, by said electronic device, said aggregate property drop by a difference between said first time and said second time to determine said integrated physical property deviation.

11. The method of claim 8, wherein said first material defines a mold in a casting process, said second material is one of a metal, a plastic, or a fiberglass, and said second material moves past said mold in a continuous manufacturing process.

12. The method of claim 11, wherein said first sensor and said second sensor are each temperature sensors, and said physical property is temperature.

13. The method of claim 8, further comprising displaying, on a display unit, said integrated physical property deviation as said second material moves past said first material.

14. The method of claim 8, further comprising moving said second material past said instrumented region of said first material according to an arbitrary speed history of a relative movement between said first material and said second material.

15. A system for determining an integrated temperature deviation in a manufacturing process, comprising:
an equipment structure having a surface and an instrumented region positioned proximate to said surface;
a material configured to move past said surface of said equipment structure in a movement direction;
a first temperature sensor and a second temperature sensor positioned in said instrumented region of said equipment structure, wherein said first temperature sensor and said second temperature sensor are aligned in said movement direction;
an electronic device operably connected to said first temperature sensor and to said second temperature sensor, and said electronic device having a non-transitory computer-readable medium comprising instructions executable by a processor to:
receive a first temperature determined by a reading from said first temperature sensor at a first time, wherein said first temperature is at a first location of said equipment structure that is proximate to a location of said material when said material is at a first position relative to said equipment structure;
determine a minimum of zero and a difference between said first temperature and a first standard temperature to provide a first temperature drop;
receive a second temperature determined by a reading from said second temperature sensor at a second time, wherein said second temperature is at a second location of said equipment structure that is proximate to said location of said material when said material is at a second position relative to said equipment structure;
determine a minimum of zero and a difference between said second temperature and a second standard temperature to provide a second temperature drop; and
determine an integrated temperature deviation at said location on said material based on said first temperature drop, said first time, said second temperature drop, and said second time.

16. The system of claim 15, wherein said instructions are further executable by said processor to integrate a function associated with said first temperature drop and said second temperature drop between said first time and said second time to determine said integrated temperature deviation.

17. The system of claim 15, wherein said instructions are further executable by said processor to:
add said first temperature drop and said second temperature drop to determine an aggregate property drop; and
divide said aggregate property drop by a difference between said first time and said second time to determine said integrated temperature deviation.

18. The system of claim 15, further comprising a display unit that displays said integrated temperature deviation as said material moves past said equipment structure.

19. The system of claim 15, wherein said instructions are further executable by said processor to:
   compare said integrated temperature deviation to a first predetermined threshold, wherein if said integrated temperature deviation meets or exceeds said first predetermined threshold, then a parameter of said manufacturing process can be altered to prevent a defect at said location of said material.

20. The system of claim 19, wherein said instructions are further executable by said processor to:
   compare said integrated temperature deviation to a second predetermined threshold that is higher than said first predetermined threshold, wherein if said integrated temperature deviation meets or exceeds said second predetermined threshold, then a defect at said location of said material can be marked.

* * * * *